United States Patent [19]

Graves

[11] Patent Number: 4,751,271
[45] Date of Patent: Jun. 14, 1988

[54] FURAZAN OXIDE MODIFIED RUBBERS AND RUBBER COMPOSITIONS CONTAINING SAME

[75] Inventor: Daniel F. Graves, Clinton, Ohio

[73] Assignee: The Firestone Tire & Rubber Company, Akron, Ohio

[21] Appl. No.: 32,830

[22] Filed: Apr. 1, 1987

Related U.S. Application Data

[63] Continuation of Ser. No. 713,374, Mar. 18, 1985, abandoned, which is a continuation-in-part of Ser. No. 653,640, Sep. 21, 1984, abandoned.

[51] Int. Cl.⁴ .............................................. C08F 8/30
[52] U.S. Cl. ............................. 525/329.3; 525/332.8; 525/332.9; 525/333.1; 525/333.2; 525/375
[58] Field of Search ............... 525/329.3, 332.8, 332.9, 525/333.1, 333.2, 375

[56] References Cited

U.S. PATENT DOCUMENTS

| | | | |
|---|---|---|---|
| 2,424,199 | 7/1947 | Ter Horst | 167/33 |
| 2,905,582 | 9/1959 | Coleman | 154/139 |
| 2,974,120 | 3/1961 | Miller | 260/45.8 |
| 3,528,098 | 9/1970 | Shaw | 260/307 |
| 3,567,798 | 3/1971 | Haefele et al. | 525/280 |
| 3,931,106 | 1/1976 | Crosby | 548/131 |
| 3,931,121 | 1/1976 | Davis | 260/768 |
| 4,014,893 | 3/1977 | Crosby et al. | 548/126 |
| 4,024,327 | 5/1977 | Diefenbach | 526/50 |
| 4,185,018 | 1/1980 | Fah | 548/126 |
| 4,557,306 | 12/1985 | Graves | 152/548 |

FOREIGN PATENT DOCUMENTS 83-04031 11/1983 European Pat. Off. .
1586861 3/1981 United Kingdom .

OTHER PUBLICATIONS

Rehner & Flary, Ind. & Eng. Chem., 38, pp. 500 et seq.
Rubber Chem. & Tech., 49, p. 1019 (1976).

Primary Examiner—Joseph L. Schofer
Assistant Examiner—Bernard Lipman
Attorney, Agent, or Firm—Daniel N. Hall

[57] ABSTRACT

Modified polymer rubber compositions prepared in solution and which exhibit desirable properties, particularly when used to form tires are described. The modified rubber compositions comprise the reaction product, prepared in solution, of at least one rubber having an unsaturated carbon chain and up to about 10 weight percent, based on the weight of the rubber, of at least one aromatic furazan oxide of the partial formula

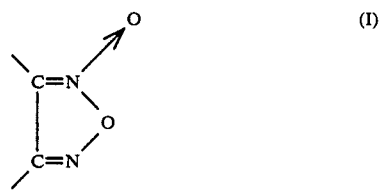

(I)

wherein the depicted carbon atoms are a part of a single fused aromatic ring. The reaction is conducted by heating the solution at an elevated temperature which may be any temperature up to the decomposition temperature of the furazan oxide. The uncured polymer rubber compositions of the invention do not have the strong characteristic odor of the furazan oxide decomposition products which facilitate handling and storage of these materials.

Filled vulcanizates also are described, and these vulcanizates are prepared by vulcanizing a composition comprising at least one of the above-described uncured polymer rubber compositions and one or more reinforcing fillers normally used in rubber compounding. The filled vulcanizates exhibit desirable properties such as decreased hysteresis, increased rebound and, when used in the tread of tires, the tires show lower running temperatures and reduced rolling resistance.

16 Claims, No Drawings

FURAZAN OXIDE MODIFIED RUBBERS AND RUBBER COMPOSITIONS CONTAINING SAME

This application is a continuation of application Ser. No. 713,374, filed Mar. 18, 1985, which is a continuation-in-part application of Application Ser. No. 653,640, filed Sept. 21, 1984 both now abandoned.

BACKGROUND OF THE INVENTION

This invention relates to furazan oxide modified rubbers, to rubber compositions containing said rubbers, and to methods for reducing the rolling resistance of pneumatic tires. More particularly, the present invention relates to uncured rubber compositions which comprise the reaction product, prepared in solution, of at least one rubber having an unsaturated carbon chain and at least one aromatic furazan oxide. Filled vulcanizates made by vulcanizing mixtures of the uncured rubber compositions of the invention and reinforcing fillers exhibit high rebound, and tires which are made to include at least a portion of said cured vulcanizates in the tread portion exhibit reduced rolling resistance.

It is known that rubber compositions generally are combined or "compounded" with various other materials before being cured and/or put into use. Some of these added materials improve the properties of the end product in service while others improve processing properties of the uncured compositions. In some instances, both effects may be achieved. It is also known that the various chemicals, pigments and other materials so used, both organic and inorganic, can interact in various ways to produce desirable or deleterious effects. For further discussions of rubber processing and materials used therein, see, for example, *Encyclopedia of Polymer Science and Technology*, published by John Wiley and Sons, New York (1970), particularly Vol. 12, page 280 and *The Vanderbilt Rubber Handbook*, R. T. Vanderbilt Company, Norwalk, Ct. 06855 (1968), particularly Sections 6, 7, 8, 9 and 11.

Vulcanizing agents, plasticizers, extenders, fillers, pigments, etc. generally are incorporated into vulcanizable rubber compositions so that the rubber can be cured or vulcanized in a mold to form useful articles. It often is necessary to include processing aids in rubber compounds prior to molding and curing. These processing aids are primarily intended to improve the mixing of the ingredients of the rubber compound, the flowability of the rubber during processing, and the mold or mill release properties of the rubber, tack and green strength, without seriously adversely affecting the properties of the cured rubber.

Carbon blacks are used in rubber formulations and vary widely as to their characteristics and combinations of characteristics. In rubber formulations, carbon black is used as a reinforcing filler. Many carbon blacks of the channel and furnace types with varying characteristics have been utilized because they impart varying desirable characteristics to the rubber.

Benzofurazan oxides, and their analogs and isomers are known compounds, and many descriptions of them and procedures for their preparation have appeared. See, for example, Kaufman et al, "Chemical Reviews", Vol. 59, page 429 and following (1959) and Mallory et al, *Organic Synthesis* collective Vol. IV, pp. 74 and 75, John Wiley and Sons, New York (1963). The following U.S. patents also describe procedures for preparing furazan oxides of various types: U.S. Pat. No. 4,185,018 to Fah; U.S. Pat. No. 3,528,098 to Shaw; and U.S. Pat. No. 2,424,199 to Ter Horst. In considering previous descriptions of furazan oxides and related compounds, it should be noted that nomenclature used for these compounds has not been consistent, in part due to uncertainty as to their structures and predominant isomeric form. For example, they have been described as furazan oxides, as ortho dinitroso benzenes or di(nitrile oxides), isobenzofuroxans, benzofuroxans, benzofurazan-N-oxides and benzofurazan oxides. It is believed that the latter term is the modern and preferred nomenclature, and it shall be used in this specification and the appended claims.

Studies of furazan oxides and related compounds in rubber have been reported. For example, Rehner and Flory have indicated in *Industrial and Engineering Chemistry*, Vol. 38, page 500 et sec, that ortho dinitroso benzene is inactive in butyl rubber as a vulcanizing agent. In contrast, the para isomer is said to be very active. U.S. Pat. No. 3,931,121 to Davis et al, describes the curing of elastomeric polymers with poly(chloronitroso) compounds. U.S. Pat. No. 3,931,106 to Crosby et al, describes the use of dinitrile oxides, (generated in situ from furazans), in rubber cross-linking.

British Pat. No. 1,586,861 describes the use of organic compounds which are sources of adjacent nitroso groups on a six-membered aromatic ring for modifying polymeric materials containing carbon-carbon unsaturation. Examples of such polymeric materials include polybutadiene, styrene-butadiene copolymers, butyl rubber, natural rubber and EPDM rubbers. The polymeric materials can contain fillers such as carbon black and fumed silica. Benzofurazan oxide is an example of a source material for the adjacent nitroso groups. The patentees suggest that the furazan oxide can be mixed with the polymeric material using conventional rubber mixing techniques or other conventional plastics or paints technology followed by heating of the mixture to effect modification of the polymer, e.g., cross-linking of the polymer. The common rubber additives may be mixed into the polymer before reacting it with the furazan oxide.

U.S. Pat. No. 2,974,120 to Miller describes the use of nonaromatic furoxans as antioxidants and antidegradants in rubber. U.S. Pat. No. 2,905,582 to Coleman et al, describes the use of nitroso compounds, including dinitroso compounds wherein the nitroso groups are on nonadjacent carbons in a method for bonding polyurethane resin to rubber bodies. Morita has described the use of N,4-dinitroso-N-methyl aniline as an active chemical promoter for carbon black reinforcement of IIR, NR and SBR. See *Rubber Chemistry and Technology*, Vol. 49, page 1019 and following (1976). Tanaka et al, have reported studies of nitroso benzene in rubber where chain cleavage was observed in Kogyo Kagaku Zasshi 74(8), pages 1701-6 (1971).

SUMMARY OF THE INVENTION

It now has been found that modified rubber compositions can be prepared in solution which exhibit desirable properties, particularly when utilized to form tires. More particularly, the modified rubber compositions comprise the reaction product, prepared in solution, of at least one rubber having an unsaturated carbon chain and up to about ten weight percent, based on the weight of the rubber, of at least one aromatic furazan oxide of the partial formula

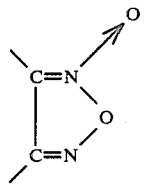

(I)

wherein the depicted carbon atoms are a part of a single fused aromatic ring. The reaction is effected by heating the solution to an elevated temperature of the furazan oxide. Preferably the reaction is conducted in the absence of rubber compounding additives and vulcanizing agents. The uncured rubber compositions of the invention do not have the strong characteristic odor normally associated with furazan oxide which facilitates handling and storage of these materials.

The invention also includes filled vulcanizates made by vulcanizing a composition comprising at least one of the above-described uncured rubber compositions and one or more reinforcing fillers normally used in rubber compounding such as carbon, silica or mixtures of carbon and silica. Rubber articles and portions thereof made from such vulcanizates such as tires, hoses, belts, treads, sidewalls and the like are also within the scope of the present invention as well as methods of reducing the rolling resistance of such tires.

DETAILED DESCRIPTION OF THE INVENTION

The rubber compositions in the first embodiment of this invention are not cured. In other words, they are not vulcanized. Moreover, in this first embodiment, the uncured rubber compositions of the present invention do not contain conventional curing agents, and most often will not contain any of the normal rubber compounding additives. The uncured rubber compositions of the present invention are furazan oxide modified rubber compositions which are reaction products, prepared in solution, of at least one rubber having an unsaturated carbon chain and up to about 10% by weight, based on the weight of the rubber, of at least one aromatic furazan oxide as defined hereinafter. Preferably the reaction is conducted in the absence of rubber compounding additives, particularly vulcanizing agents.

The rubbers used herein contain carbon-carbon unsaturation in their molecular structure and these rubbers include natural as well as synthetic rubbers. The rubber compositions used in the present invention include natural rubber and rubber-like polymers produced by polymerizing aliphatic, conjugated diolefins, especially those containing 4 to 8 carbon atoms per molecule such as butadiene, isoprene, pentadienes, etc., or the copolymers of such dienes. The rubbers used in the uncured compositions of this invention have unsaturated carbon chains. That is, their polymer backbones contain a significant amount of unsaturation, in contrast to the pendant or vinyl saturation found in some other types of rubbers. Typically, the chains of such unsaturated rubbers have at least about 5% of their carbon-to-carbon bonds as unsaturated bonds. Characterization of rubber as having unsaturated carbon chains is well known in the art as shown by ANSI/ASTM Standard D 1418-79A where unsaturated-chain rubbers are referred to as R rubbers. Class R rubbers include natural rubber and various synthetic rubbers derived at least partly from diolefins. The following is a non-exclusive list of R class rubbers which can be used in the compositions of the present invention:

ABR—Acrylate-butadiene
BR—Butadiene
CIIR—Chloro-isobutene-isoprene
CR—Chloroprene
IR—Isoprene, synthetic
NBR—Nitrile-butadiene
NCR—Nitrile-chloroprene
NIR—Nitrile-isoprene
NR—Natural rubber
SBR—Styrene-butadiene
SCR—Styrene-chloroprene
SIR—Styrene-isoprene rubbers Of these, the NR, IR, BR, SBR or mixtures of two or more of these are typically used. BR and SBR are preferred. Many compositions are made wherein the rubber is NR, SBR or a mixture containing at least about 50% of one of these. Compositions containing only NR as the rubber portion are often used. In the context of this invention, NR includes both hevea and guayule rubber as well as mixtures thereof.

The rubbers used herein having carbon-carbon unsaturation also may be other than the R rubbers such as EPDM. EPDM rubbers are derived from ethylene-propylene-diene monomer and generally about 3-8% of their carbon bonds are unsaturated bonds.

The furazan oxides used in preparing the uncured rubber compositions of this invention are fused aromatic, that is, they have an aromatic ring fused to the N-oxidized heterocyclic furazan ring. They are of the partial formula

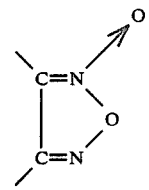

(I)

wherein the depicted carbon atoms are part of a fused, single aromatic ring. This aromatic ring can be carbocyclic such as a benzene ring or it may be heterocyclic, such as a pyridine ring. It can be the only additional ring in the furazan compound, or it can be part of a linked or fused ring system. It is only necessary that both of the depicted carbon atoms are part of the same aromatic ring.

Preferred examples of the furazan oxides within the scope of Formula I useful in preparing the uncured rubber compositions of this invention are those that can be represented by the Formulae II-V.

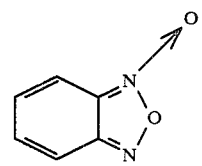

(II)

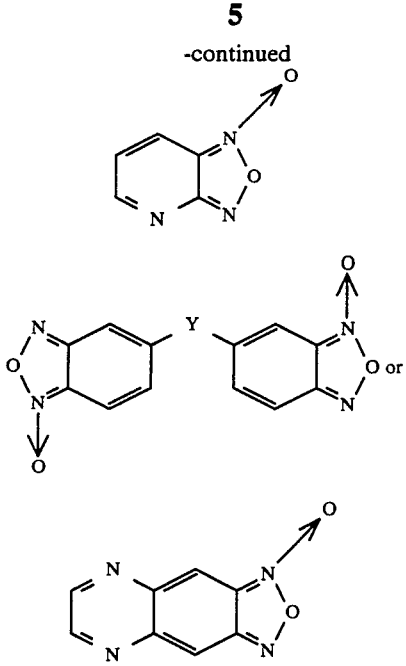

wherein none, one or any two of the ring positions can be substituted with lower hydrocarbyl, halogen, hydroxyl, lower hydrocarbyloxy, lower hydrocarbylthio, lower hydrocarbyl carbonyl, carbonyl lower hydrocarbyloxy, nitro, amino or amine groups and Y is a linking atom or group. In this context, lower hydrocarbyl refers to groups containing carbon and hydrogen having 8 or less carbon atoms such as methyl, ethyl, butyl, pentyl, heptyl, octyl (all isomers). Linking atoms or grups Y include ether, thio ether, sulfoxide, sulfone, amine, methylene and the like (including a simple covalent bond such as found in biphenyl) and the other linking groups shown in U.S. Pat. No. 3,528,098 (which is incorporated by reference herein for its disclosures in this regard). Hydrocarbyloxa, hydrocarbylthia and mixed hydrocarbyloxathia substituents are also possible where the hydrocarbyl groups are typically lower alkylene moieties. Such are often made from glycols, dithiols, epoxides and episulfides. Often the furazan oxide is a benzofurazan oxide of the formula

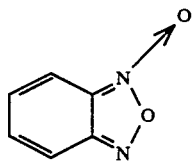

wherein none, one or any two of the ring positions can be substituted with lower hydrocarbyl, halogen, lower hydrocarbyloxy, lower hydrocarbylthio, lower hydrocarbyl carbonyl, carbonyl lower hydrocarbyloxy, nitro, amine or amino groups. Typically, the furazan oxide is benzofurazan oxide or the methyl or methoxy analog thereof.

Methods for preparing, purifying and handling these compounds are known to the art as is shown by the references cited hereinabove. The preparation of halogenated benzofurazan oxides and other substituted derivatives is described by Boulton et al in *J. Chem. Soc.* (1965) 5958. Benzotri (furazan oxide) can be prepared by the method described by Barley and Case in *Tetrahedron*, 3 (1958) 113. It should be noted that some of these furazan oxides, particularly those containing relatively large amounts of nitrogen and oxygen, such as benzotri (furazan oxide) and 4,6-di-(nitro)benzofurazan oxide, are prone to rapid decomposition to the point of explosions; all may be physiologically active to varying degrees. Therefore, care in their handling and use should be exercised.

The uncured rubber compositions of the invention are prepared by reacting at least one of the above-described rubbers containing an unsaturated carbon chain with up to about ten weight percent, based on the weight of the rubber of at least one of the above-described aromatic furazan oxides. It is critical to this invention that the reaction be conducted in solution. That is, the reaction between the rubber and the aromatic furazan oxide is not conducted using conventional rubber mixing techniques, but rather, the rubber is dissolved in a solvent which is also a solvent for the aromatic furazan oxide, and, thus, the reaction is conducted in solution. The solvent may be any liquid in which the reactants are soluble so long as the solvent is non-reactive (that is, inert) with the individual reactants. Otherwise, the solvent is not critical. Hydrocarbon solvents are particularly useful, and examples of such solvents include cyclohexane, toluene, etc.

The concentration of the reactants in the solution is not critical although excessive amounts of solvents should be avoided to minimize cost and handling problems. Also, the use of very dilute solutions of the reactants may result in the reaction being unnecessarily slow.

The relative amounts of the rubber and aromatic furazan oxide can be varied although it is generally preferred that the reaction solution contain up to about 10% by weight of the aromatic furazan oxide based on the weight of the rubber. Preferably the solution will contain less than 5% of the furazan oxide since excessive amounts of the furazan oxide may result in formation of modified rubbers having undesirable properties such as higher hysteresis due to cleavages of the rubber molecules and increases in Tg (glass transition temperature). More generally, up to about two weight percent of the aromatic furazan oxide, based on the weight of the rubber, will be incorporated into the solution containing the reaction mixture. Although not all of the furazen oxide may react with the rubber, excess furazan oxide, as well as degradation products are subsequently removed upon completion of the reaction when the reaction product is coagulated and washed. Generally, from about 0.001 to about 0.5 moles of the aromatic furazan oxide is reacted per mole of rubber.

The reaction between the rubber and the aromatic furazan oxide in solution is conducted at temperatures up to the decomposition temperature of the furazan oxide. More generally, the reaction is conducted at an elevated temperature up to the boiling point of the solvent used in the solution and more generally at temperatures of from about 60° C. to about 150° C. or higher when higher boiling solvents are used or the reaction is conducted at pressures above atmospheric pressure. The reaction between the rubber and the furazan oxide proceeds in the absence of any initiators, promoters, curing agents, or any of the additives normally used in rubber formulations and in rubber compounding procedures. The time of the reaction, depending upon the reaction temperature and concentration of reactants in the solvent may vary over a wide range although the reaction generally is completed in a period of from about 5 to 20 hours.

The following examples illustrate the preparation of the uncured rubber compositions of the present invention. Unless otherwise indicated in the examples or elsewhere in the application, all parts and percentages are by weight and temperatures are in °C.

EXAMPLE 1

Fifty grams of solution SBR is dissolved in 600 ml. of cyclohexane, and 0.5 gram of methyl benzofurazan oxide (MBFO) is added to the solution with stirring. The solution is heated for 4 hours at 80° C. and for an additional 16 hours at 120° C. The reaction product is coagulated in methanol and washed several times with fresh methanol. The product then is dried in a vacuum oven overnight. The product obtained in this manner is analyzed and characterized as follows. For comparison, the data on the starting SBR polymer also is included in the following Table I. In this and the following examples, the nitrogen content is determined by the Kjeldahl method, and the molecular weight determination were made by gel permeation chromatograph.

TABLE I

| Polymer Characterization | | |
|---|---|---|
| | Starting SBR | Reaction Product |
| % Nitrogen | 0 | 0.077 |
| Mn | 116,432 | 76,589 |
| Mw | 476,931 | 298,127 |
| Mz | 1,576,391 | 976,382 |
| Vis | 3.25 | 2.33 |

EXAMPLE 2

The procedure of Example 1 is repeated except that an equivalent amount of benzofurazan oxide is substituted for the methyl benzofurazan oxide.

EXAMPLE 3

The procedure for Example 1 is repeated except that an equivalent amount of a synthetic polyisoprene rubber composition is utilized in place of the SBR rubber.

EXAMPLE 4

Synthetic isoprene rubber is reacted with 20 phr of benzofurazan oxide (BFO) in toluene for 16 hours at 110° C. The modified polymer product is coagulated and washed with methanol. The dried polymer is analyzed and is characterized as follows:

TABLE II

| | Starting IP | Reaction Product |
|---|---|---|
| % Nitrogen | 0.02 | 0.69 |
| Mn | 119,400 | 26,038 |
| Mw | 687,700 | 92,119 |
| Mw/Mn | 5.758 | 3.54 |

Based on the nitrogen analysis, about 23% of the BFO is attached to the polymer under these reaction conditions.

EXAMPLE 5

A styrene-butadiene copolymer prepared by emulsion techniques is reacted with 1 phr of BFO for 16 hours at 105° C. in toluene. The modified polymer is recovered by coagulation and washed in methanol.

EXAMPLE 6

A solution of 25 grams of a synthetic isoprene rubber in 500 ml of cyclohexane is prepared, and 2.5 grams (10 wt %) of methyl benzofuranzan oxide (MBFO) are added. The mixture is heated overnight at 80° C. followed by five hours of heating in a 100° C. oven. The solvent is removed leaving an orange-red liquid polymer which is dried under vacuum.

The uncured modified rubber compositions prepared in accordance with the process of this invention and illustrated in Examples 1–6 above, may be blended with reinforcing fillers such as carbon blacks and silica in the absence of curing agents, to insure that complete mixing of the filler occurs before the rubber is vulcanized. Also the compositions are prepared without addition of vulcanizing agents when they are to be used in such applications as sealants, caulks, adhesives, etc.

The carbon blacks include any of the commonly available, commerically-produced carbon blacks but those having a surface area (EMSA) of at least 20 $m^2/g$. and more preferably at least 35 $m^2/g$. up to 200 $m^2/g$. or higher are preferred. Surface area values used in this application are those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black products of the invention. Typical values for surface areas of usable carbon blacks are summarized in the following Table III.

TABLE III

| Carbon Blacks | |
|---|---|
| ASTM Designation (D-1765-82a) | Surface Area ($m^2/g$) (D-3765) |
| N-110 | 126 |
| N-220 | 111 |
| N-339 | 95 |
| N-330 | 83 |
| N-550 | 42 |
| N-660 | 35 |

The carbon blacks utilized in the preparation of the filled vulcanizates of the invention may be in pelletized form or an unpelletized flocculant mass. Preferably, for more uniform mixing, unpelletized carbon black is preferred.

When curing agents are mixed with the modified rubber compositions of the present invention, they may be conventional types such as sulfur- or peroxide-based curing systems. They are used in conventional amounts and incorporated in the uncured compositions of the invention by known techniques and procedures. Fillers (in addition to carbon black and silica) may be, and often are present as is known to those skilled in the art. Typical fillers include glass, talc and similar finely divided mineral materials.

In addition to the fillers, other materials normally used in conventional rubber formulations such as antioxidants, accelerators, retarders, promoters and the like may be incorporated into the compositions of the invention.

The vulcanizable compositions containing the modified rubbers of the present invention can be prepared by conventional techniques in using various types of mills, blenders and mixers known in the art. The cured compositions can be made by the same techniques followed by curing.

The temperature used in formulating the rubber compositions of this invention range from ambient to those normally used in the art such as 75° to 175° or even higher depending upon a particular modified rubber composition being processed. Because of the shear forces involved in formulating the rubber compositions, the formulation process is exothermic and high temperatures are normal.

The vulcanizates of the present invention are made by vulcanizing a mixture comprising at least one of the modified rubber compositions of the invention, fillers, conventional curing systems and agents such as sulfur, antioxidants, accelerators, retarders, coupling agents, promoters, etc. The vulcanizates of this invention are prepared by curing these compositions containing the modified rubber compositions and other additions under conditions of temperature and time customarily used in the art. Typically, the modified rubber, carbon black and other fillers are mixed, the sulfur and accelerators are added, and the mixture is cured. Other mixing sequences can be used, but it is essential to have the rubber and carbon black product intimately combined before vulcanization.

The following examples illustrate the preparation of vulcanized rubber compositions in accordance with the invention utilizing a modified rubber of the invention. Conventional rubber compounding materials, conditions, temperatures, procedures and evaluation techniques are used unless noted to the contrary.

EXAMPLE A

A mixture of 100 parts of the product of Example 1, 60 parts of carbon black (ISAF), 5 parts of zinc oxide, 2 parts of stearic acid, 1.2 parts of Santocure NS and 1.8 parts of sulfur is prepared utilizing an internal mixer such as a Brabender or small size Banbury mixer at about 138° C. over a period of about 6 minutes. The mixture is then cured at a temperature of about 290° C. over a period of 35 minutes. Some of the properties of the cured rubber composition prepared in this manner are summarized in the following Table IV. For a comparison, the properties of a control compound utilizing the same ingredients except that the rubber utilized is the unmodified rubber starting material utilized in Example 1 (but subjected to the same temperature conditions) also are included in Table IV for comparison.

TABLE IV

| Property | Control | Product of Example A |
| --- | --- | --- |
| Shore A Hardness at 73° F. | 76 | 75 |
| % Rebound | | |
| at 73° F. | 52 | 57 |
| at 212° F. | 65 | 67 |
| Electrical Resistivity | 30 | 165 |

TABLE IV-continued

| Property | Control | Product of Example A |
| --- | --- | --- |
| (ohms × 1000) | | |

EXAMPLE B

A mixture of 100 parts of the product of Example 5 and 40 phr of N339 carbon black in a normal test recipe is prepared and cured at a temperature of about 290° C. over a period of about 35 minutes. Some of the properties of this cured rubber are listed in Table V. The control sample contains the same formulation, but the SBR is not modified with BFO and was not coagulated. The coagulation step would result in an addition decrease in hysteresis by removing low molecular weight species, such as soaps and modifiers which are common in emulsion polymers.

TABLE V

| Property | Control | Product of Example B |
| --- | --- | --- |
| Shore A Hardness at 73° F. | 62 | 62 |
| % Rebound | | |
| at 73° F. | 52 | 63 |
| at 212° F. | 65 | 67 |
| MTS Tan delta at 73° F. | 0.167 | 0.118 |

EXAMPLE C

A mixture of 100 parts of SBR, 10 parts of the product of Example 6 and 60 parts of N-339 carbon black in a normal test recipe is prepared and cured in the normal manner. Some of the properties of this cured rubber are listed in Table VI. The control sample contains the same ingredients except that the product of Example 6 is replaced by 10 parts of a depolymerized natural rubber having about the same viscosity as the product of Example 6.

TABLE VI

| Property | Control | Product of Example C |
| --- | --- | --- |
| Rebound (%) at 73° F. | 53 | 57 |
| Resisitivity (ohms × 1000) | 150 | 300 |
| Monsanto Rheometer (300° F.) | | |
| TS(2) | 12.0 | 11.3 |
| TC(90) | 22.4 | 19.3 |
| Min. Torque | 11.7 | 12.7 |
| Max. Torque | 47.8 | 49.0 |

The vulanizable rubber compositions of the invention resulting from the use of the modified rubbers can be molded or shaped into the desired shapes by known techniques, and they can be used for many purposes for which similar compositions are used. For example, they can be used for tire tubes, tire treads, tire casings, shoe soles and heels, raincoats, table covers, hose for transmission of fluids, belts, printer rolls, printer's blankets, engraving plates, battery cases, etc. The use in tire and particularly in tread stock are preferred.

Among the desirable and beneficial properties exhibited by the unvulcanized and vulcanized rubber compositions of the invention are a decrease in the undesirable odor often associated with benzofurazan oxides, an increase in rebound, a decrease in hysteresis, and when the compositions are used in the treads of tires, the tires exhibit a decrease in rolling resistance.

While the invention has been described and exemplified herein by reference to specific materials, machinery, techniques, procedures and examples, it is understood that it is not restricted to any of these numerous variations, combinations, and permutations can be made within the scope of the invention as is clear to those skilled in the art.

I claim:

1. An uncured rubber composition prepared by the process comprising
   (A) heating a solution of at least one rubber containing an unsaturated carbon chain and from about 0.001 to 0.5 mole per mole of rubber, of at least one aromatic furazan oxide of the partial formula

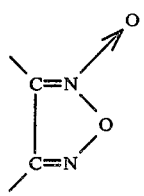

wherein the depicted carbon atoms are part of a single fused aromatic ring, in at least one solvent to an elevated temperature up to the decomposition temperature of the furazan oxide,
   (B) coagulating the reacted rubber product, and
   (C) recovering the coagulated product.

2. The uncured rubber composition of claim 1 wherein the rubber is NR, IR, BR, SBR, CR, CIIR, NIR or a mixture of two or more of said rubbers.

3. The uncured rubber composition of claim 2 wherein the rubber is NR, SBR or a mixture containing at least about 50% of one of these.

4. The uncured rubber composition of claim 1 wherein the reaction product of the rubber containing an unsaturated carbon chain and the aromatic furazan oxide is prepared in the absence of rubber compounding additives and vulcanizing agents.

5. The uncured rubber composition of claim 1 wherein the furazan oxide is of the formula

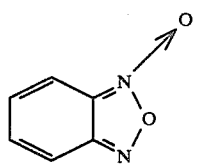

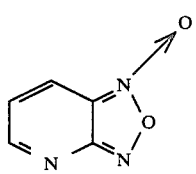

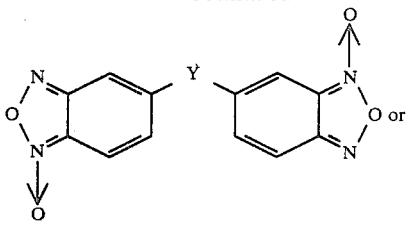

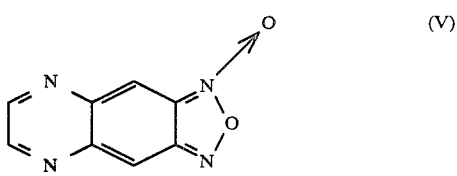

wherein none, one or any two of the ring positions can be substituted with lower hydrocarbyl, halogen, hydroxyl, lower hydrocarbyl oxy, lower hydrocarbyl thio, lower hydrocarbylthia-, -oxa, and -thia, -oxa, lower hydrocarbyl carbonyl, carbonyl lower hydrocarbyl oxy, nitro, amine or amino groups and Y is a linking atom or group.

6. The uncured rubber composition of claim 5 wherein the furazan oxide is of the formula

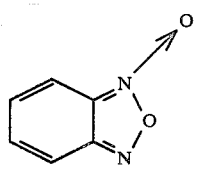

wherein none, one or any two of ring positions can be substituted with lower hydrocarbyl, halogen, hydroxyl lower hydrocarbyl oxy, lower hydrocarbyl thio, lower hydrocarbyl carbonyl, carbonyl lower hydrocarbyl oxy, nitro, amine or amino groups.

7. The uncured rubber composition of claim 1 wherein the furazan oxide is a benzofurazan oxide or a methyl or methoxy analog thereof.

8. A process for modifying the properties of an uncured rubber containing carbon-carbon unsaturation comprising
   (A) reacting said rubber in a solution containing at least one uncured rubber containing carbon-carbon unsaturation and from about 0.001 to 0.5 mole per mole of rubber of at least one aromatic furazan oxide of the partial formula

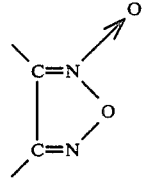

wherein the depicted carbon atoms are part of a single fused aromatic ring, wherein the reaction is effected by heating the solution to an elevated temperature up to the decomposition temperature of the furazan oxide,
   (B) coagulating the reacted rubber product, and (C) recovering the coagulated product.

9. The process of claim 8 wherein the rubber is NR, IR, BR, SBR, CR, CIIR, NIR or a mixture of two or more of said rubbers.

10. The process of claim 9 wherein the rubber is NR, SBR or a mixture containing at least about 50% of one of these.

11. The process of claim 8 wherein the reaction is conducted in the absence of rubber compounding additives and vulcanizing agents.

12. The process of claim 8 wherein the furazan oxide is of the formula (II)

(III)

(IV)

(V)

13. The process of claim 8 wherein the furazan oxide is of the formula wherein none, one or any two of ring positions can be substituted with lower hydrocarbyl, halogen, hydroxyl lower hydrocarbyl oxy, lower hydrocarbyl thio, lower hydrocarbyl carbonyl, carbonyl lower hydrocarbyl oxy, nitro, amine or amino groups.

14. The process of claim 13 wherein the furazan oxide is a benzofurazan oxide or the methyl or methoxy analog thereof.

15. The composition of claim 1 wherein the recovered coagulated product is washed to remove unreacted furazan oxide and degradation by-products.

16. The process of claim 8 wherein the recovered coagulated product is washed to remove unreacted furazan oxide and degradation by-products.

* * * * *